United States Patent
Fujimaki et al.

(10) Patent No.: US 11,590,975 B2
(45) Date of Patent: Feb. 28, 2023

(54) VEHICLE SPEED CONTROL DEVICE AND VEHICLE SPEED CONTROL METHOD

(71) Applicant: ISUZU MOTORS LIMITED, Tokyo (JP)

(72) Inventors: Yuuta Fujimaki, Fujisawa (JP); Takahiro Satou, Fujisawa (JP); Ryouta Okeya, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 575 days.

(21) Appl. No.: 16/629,014

(22) PCT Filed: Jul. 2, 2018

(86) PCT No.: PCT/JP2018/025001
§ 371 (c)(1),
(2) Date: Jan. 6, 2020

(87) PCT Pub. No.: WO2019/009227
PCT Pub. Date: Jan. 10, 2019

(65) Prior Publication Data
US 2020/0198633 A1 Jun. 25, 2020

(30) Foreign Application Priority Data
Jul. 7, 2017 (JP) .............................. JP2017-133456

(51) Int. Cl.
*B60W 30/14* (2006.01)

(52) U.S. Cl.
CPC ....... *B60W 30/143* (2013.01); *B60W 2552/15* (2020.02); *B60W 2720/10* (2013.01)

(58) Field of Classification Search
CPC .................. B60W 30/143; B60W 30/18163
See application file for complete search history.

(56) References Cited

U.S. PATENT DOCUMENTS

| 2005/0015203 A1 | 1/2005 | Nishira |
| 2007/0067100 A1 | 3/2007 | Matsumoto |

(Continued)

FOREIGN PATENT DOCUMENTS

| CN | 102436763 A | 5/2012 |
| CN | 105593700 A | 5/2016 |

(Continued)

OTHER PUBLICATIONS

German Patent and Trademark Office, Office Action, Application No. 11 2018 003 446.1, dated Nov. 8, 2021, in 15 pages.

(Continued)

*Primary Examiner* — Anshul Sood
(74) *Attorney, Agent, or Firm* — Procopio, Cory, Hargreaves & Savitch LLP

(57) ABSTRACT

A vehicle control device has a first calculating unit calculating a first arrival time until a vehicle reaches a lane change position where a first lane along which the vehicle is traveling and a second lane merge, or the first lane and the second lane separates, a second calculating unit calculating a second arrival time until another vehicle traveling along the second lane reaches the lane change position, and a speed control unit controlling the speed of the vehicle such that the vehicle enables to make a lane change to the second lane ahead of the other vehicle when the first arrival time is shorter than the second arrival time, and controlling the speed of the vehicle such that the vehicle enables to make a lane change to the second lane behind the other vehicle when the first arrival time is equal to or greater than the second arrival time.

4 Claims, 4 Drawing Sheets

(a)  (b)
(1) CALCULATE ARRIVAL TIMES T1, T2
   UNTIL VEHICLES V, OV REACH POSITION P RESPECTIVELY
(2A) T1 < T2
   CONTROL SPEED SUCH THAT VEHICLE V
   MAKES A LANE CHANGE AHEAD OF VEHICLE OV
(2B) T1 ≥ T2
   CONTROL SPEED SUCH THAT VEHICLE V
   MAKES A LANE CHANGE BEHIND VEHICLE OV

(56) References Cited

U.S. PATENT DOCUMENTS

| | | | |
|---|---|---|---|
| 2012/0078500 A1 | 3/2012 | Yamada et al. | |
| 2015/0066327 A1* | 3/2015 | Syed .................. | B60W 30/143 |
| | | | 701/93 |
| 2015/0100216 A1 | 4/2015 | Rayes | |
| 2017/0158199 A1 | 6/2017 | Pallett et al. | |
| 2017/0203764 A1* | 7/2017 | Fujiki .................. | B60W 10/04 |
| 2018/0354518 A1* | 12/2018 | Inou ................ | B60W 30/18163 |

FOREIGN PATENT DOCUMENTS

| | | | |
|---|---|---|---|
| CN | 105976641 A | 9/2016 | |
| DE | 102004034445 A1 | 4/2005 | |
| DE | 102016123648 A1 | 12/2016 | |
| JP | H10-105895 A | 4/1998 | |
| JP | H11-053685 A | 2/1999 | |
| JP | H11-161895 A | 6/1999 | |
| JP | 2002-337714 A | 11/2002 | |
| JP | 2016-018495 A | 2/2016 | |

OTHER PUBLICATIONS

International Search Report and Written Opinion for related International Application No. PCT/JP2018/025001, dated Aug. 21, 2018; English translation of ISR provided (7 pages).

The State Intellectual Property Office of People's Republic of China, The First Office Action, Application No. 201880045380.7, dated Jul. 1, 2022, in 22 pages.

\* cited by examiner

VEHICLE SPEED CONTROL DEVICE AND VEHICLE SPEED CONTROL METHOD

CROSS-REFERENCE TO RELATED APPLICATIONS

This application is a U.S. National Stage entry of PCT Application No: PCT/JP2018/025001 filed on Jul. 2, 2018, which claims priority to Japanese Patent Application No. 2017-133456, filed Jul. 7, 2017, the contents of which are incorporated herein by reference.

TECHNICAL FIELD

The present disclosure relates to a vehicle speed control device and a vehicle speed control method.

BACKGROUND ART

A technique is known in which steering control is performed so that a vehicle travels on a traveling lane (See, for example, Patent Literature 1).

CITATION LIST

Patent Document

Patent Literature 1: JP-A-2002-337714

SUMMARY OF THE INVENTION

Technical Problem

When a lane, on which a vehicle is traveling, merges into another lane to disappear, or a lane, on which a vehicle is traveling, separates from another lane, the vehicle in which steering control is performed may make a lane change from the traveling lane to another lane. In this case, it is required to perform control such that the vehicle does not collide with another vehicle traveling on the another lane to which the vehicle is going to shift.

An object of the present disclosure is to provide a vehicle speed control device and a vehicle speed control method in which when a lane, on which a vehicle is traveling, merges into or separates from another lane in front of the vehicle, the vehicle can make a lane change so as not to collide with another vehicle traveling on a lane different from the traveling lane.

Solution to Problem

A vehicle speed control device according to the present disclosure is a vehicle speed control device that controls a speed of a vehicle when the vehicle makes a lane change from a first lane, on which the vehicle is traveling, to a second lane, in a case where the first lane merges into the second lane to disappear in front of the vehicle, or in a case where the first lane separates from a second lane in front of the vehicle, the vehicle speed control device including:

a first arrival time calculating unit configured to calculate a first arrival time, which is a period of time until the vehicle reaches a lane change position that is a position where a merge of the first lane and the second lane is completed or a position where a separation of the first lane and the second lane begins;

a second arrival time calculating unit configured to calculate a second arrival time, which is a period of time until another vehicle traveling on the second lane within a prescribed range of the vehicle reaches the lane change position; and a speed control unit configured to control the speed of the vehicle such that the vehicle enables to make a lane change to the second lane ahead of the another vehicle in a case where the first arrival time is shorter than the second arrival time, and configured to control the speed of the vehicle such that the vehicle enables to make a lane change to the second lane behind the another vehicle in a case where the first arrival time is equal to or greater than the second arrival time.

In the case where the first arrival time is shorter than the second arrival time, when a difference between the second arrival time and the first arrival time is within a prescribed time, the speed control unit may determine whether or not the vehicle enables to make a lane change to the second lane ahead of the another vehicle based on a performance of the vehicle, and the speed control unit may be configured to:
accelerate the vehicle when the speed control unit determines that the vehicle enables to make a lane change to the second lane ahead of the another vehicle; and
decelerate the vehicle when the speed control unit determines that the vehicle does not enable to make a lane change to the second lane ahead of the another vehicle.

The vehicle speed control device may further include a gradient identifying unit configured to identify a gradient of the first lane, in which in a case where the first arrival time is shorter than the second arrival time, when the difference between the second arrival time and the first arrival time is within the prescribed time, the speed control unit may determine whether or not the vehicle enables to make a lane change to the second lane ahead of the another vehicle based on the performance of the vehicle and the gradient of the first lane.

A vehicle speed control method according to the present disclosure is a vehicle speed control method of controlling a speed of a vehicle with a computer when the vehicle makes a lane change from a first lane, on which the vehicle is travelling, to a second lane, in a case where the first lane merges into the second lane to disappear in front of the vehicle, or in a case where the first lane separates from a second lane in front of the vehicle, the vehicle speed control method including:

executing with the computer:
a step of calculating a first arrival time, which is a period of time until the vehicle reaches a lane change position that is a position where a merge of the first lane and the second lane is completed or a position where a separation of the first lane and the second lane begins;
a step of calculating a second arrival time, which is a period of time until another vehicle traveling on the second lane within a prescribed range of the vehicle reaches the lane change position; and
a step of controlling the speed of the vehicle such that the vehicle enables to make a lane change to the second lane ahead of the another vehicle in a case where the first arrival time is shorter than the second arrival time, and controlling the speed of the vehicle such that the vehicle enables to make a lane change to the second lane behind the another vehicle in a case where the first arrival time is equal to or greater than the second arrival time.

Advantageous Effects of the Invention

According to the vehicle speed control device and the vehicle speed control method of the present disclosure, when a lane, on which a vehicle is traveling, merges into or separates from another lane in front of the vehicle, the vehicle can make a lane change so as not to collide with another vehicle traveling on a lane different from the traveling lane.

DESCRIPTION OF EMBODIMENTS

[Outline of Vehicle Control Device 10]

Figure 1:
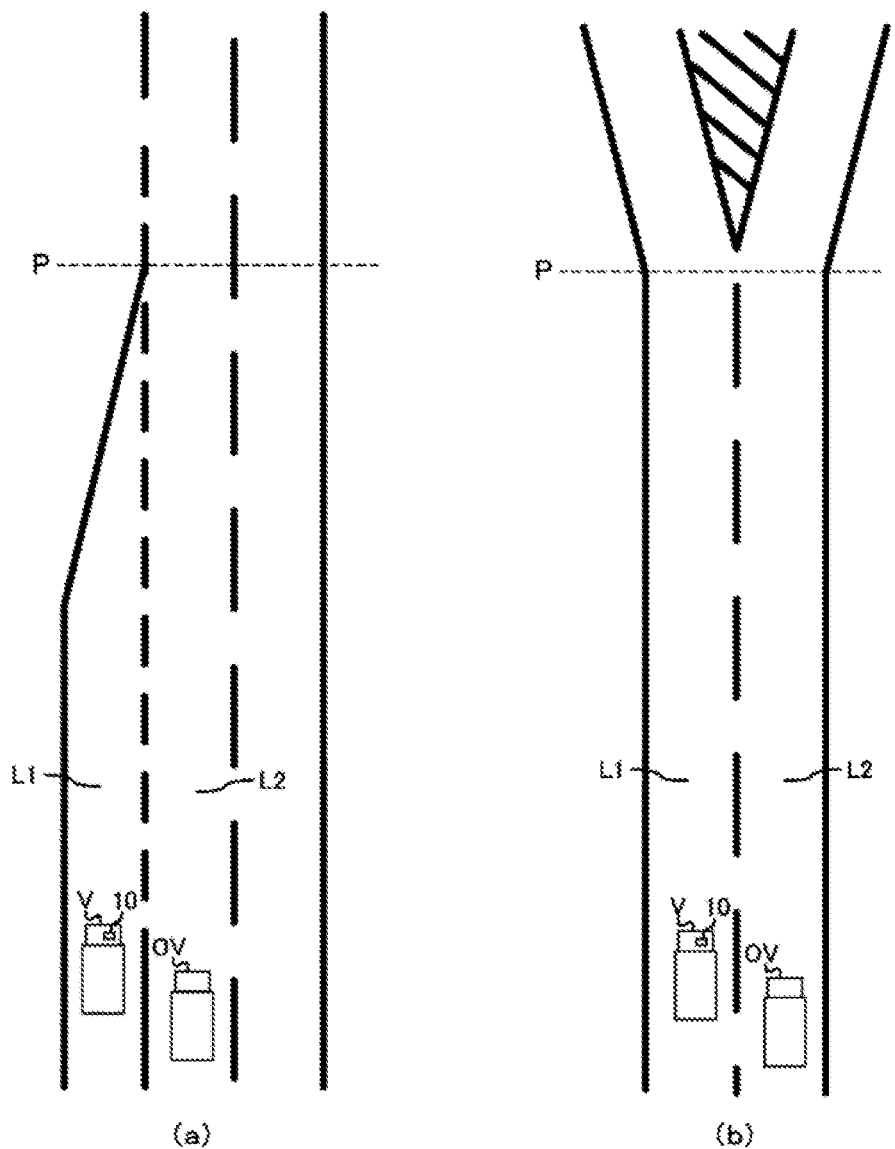
FIG. 1 explains an outline of a vehicle control device according to an embodiment.

FIG. 1 explains an outline of vehicle control device 10 according to an embodiment. The vehicle control device 10 is, for example, a device for controlling behavior of a large vehicle V such as a bus or a track, and functions as a vehicle speed control device.

As shown in (a) of FIG. 1, in a case where a first lane L1, on which the vehicle V is traveling, merges into an adjacent second lane L2 to disappear in front of the vehicle V, the vehicle V is required to make a lane change from the first lane L1 to the second lane L2. Further, as shown in (b) of FIG. 1, in a case where a first lane L1, on which the vehicle V is traveling, separates from an adjacent second lane L2 that is parallel to the first lane L1, the vehicle V may make a lane change from the first lane L1 to the second lane L2.

As shown in FIG. 1, when another vehicle OV is traveling on the second lane L2, the vehicle control device 10 calculates a first arrival time T1, which is a period of time until the vehicle V reaches a position P that is a position where a merge of the first lane L1 and the second lane L2 is completed or a position where a separation of the first lane L1 and the second lane L2 begins (hereinafter collectively referred to as "lane change position"), and a second arrival time T2, which is a period of time until the other vehicle OV reaches the lane change position P ((1) of FIG. 1).

The vehicle control device 10 controls the speed of the vehicle V such that in a case where the first arrival time T1 is shorter than the second arrival time T2, the vehicle V enables to make a lane change from the first lane L1 to the second lane L2 ahead of the other vehicle OV ((2A) of FIG. 1).

The vehicle control device 10 controls the speed of the vehicle V such that in a case where the first arrival time T1 is equal to or greater than the second arrival time T2, the vehicle V enables to make a lane change from the first lane L1 to the second lane L2 behind the other vehicle OV ((2B) of FIG. 1).

As a result, in a case where the vehicle V makes a lane change from the first lane L1 to the second lane L2, the vehicle control device 10 can control the vehicle V such that the vehicle V does not collide with the other vehicle OV traveling on the second lane L2.

Next, a configuration of the vehicle control device 10 will be described.

[Configuration of Vehicle Control Device 10]

Figure 2:
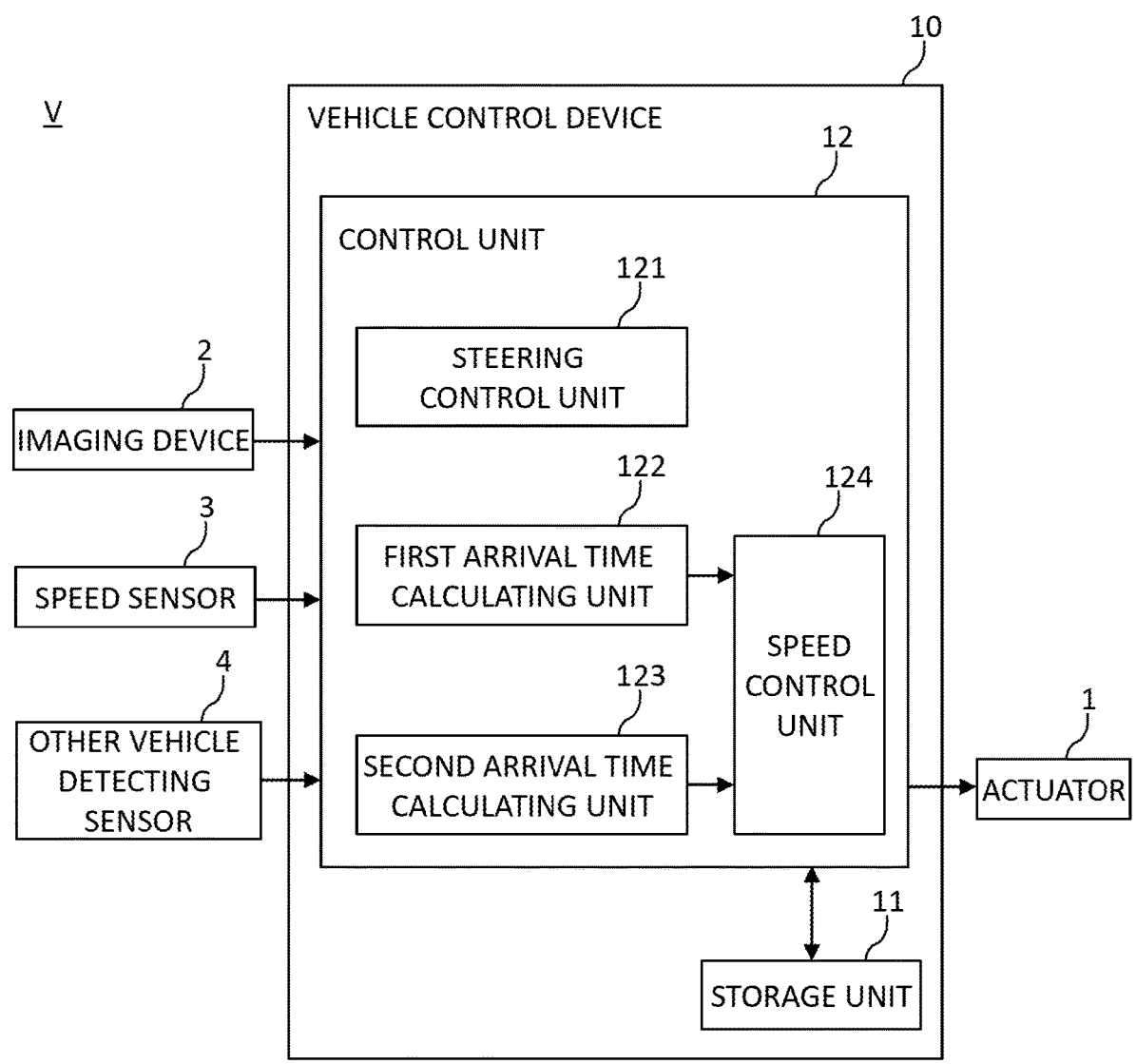
FIG. 2 illustrates a configuration example of the vehicle control device according to the embodiment.

FIG. 2 illustrates a configuration example of the vehicle control device 10 according to the present embodiment.

As shown in FIG. 2, vehicle control device 10 is electrically connected to an actuator 1, an imaging device 2, a speed sensor 3, and an other vehicle detecting sensor 4 that are provided in the vehicle V.

The actuator 1 includes a drive actuator and a brake actuator. The drive actuator controls a throttle opening degree of an engine (not shown) in accordance with control of vehicle control device 10 so as to change the speed of the vehicle V. The brake actuator operates a brake (not shown) in accordance with control of vehicle control device 10 so as to brake the vehicle V.

The imaging device 2 captures an image of the front side in a travel direction of the vehicle V including the lane on which the vehicle V travels every prescribed time (for example, 10 milliseconds). The imaging device 2 outputs the captured image to the vehicle control device 10.

The speed sensor 3 detects the speed of vehicle V. The speed sensor 3 outputs speed information indicating the speed of vehicle V to the vehicle control device 10.

The other vehicle detecting sensor 4 detects the other vehicle OV traveling within a prescribed range from the vehicle V. The other vehicle detecting sensor 4 includes, for example, millimeter wave radars provided on the front side, a lateral side, and the rear side of vehicle V. The other vehicle detecting sensor 4 causes the plurality of millimeter wave radars to emit millimeter waves and to receive millimeter waves reflected by the other vehicle OV traveling within the prescribed range from the vehicle V (reflected waves), so as to detect the other vehicle OV.

The other vehicle detecting sensor 4 measures a relative speed between the vehicle V and the other vehicle OV based on a frequency of the millimeter waves emitted by the millimeter wave radars and a frequency of the received reflected waves. Further, the other vehicle detecting sensor 4 measures a relative distance between the vehicle V and the other vehicle OV based on a period of time from emission of the millimeter waves until reception of the reflected waves. Moreover, the other vehicle detecting sensor 4 measures a relative position of the other vehicle OV with respect to the vehicle V.

The other vehicle detecting sensor 4 outputs other vehicle information indicating the measured relative speed, relative distance, and relative position between the vehicle V and the other vehicle OV to the vehicle control device 10. In a case where the other vehicle OV is not detected, the other vehicle detecting sensor 4 outputs non-detection information indicating that the other vehicle OV is not detected to the vehicle control device 10.

In the present embodiment, the other vehicle detecting sensor 4 detects the other vehicle OV using the millimeter wave radars, but is not limited thereto. The other vehicle detecting sensor 4 may detect the other vehicle OV based on an image captured by an imaging device that images the surroundings of the vehicle V. The other vehicle detecting sensor 4 may detect the other vehicle OV via inter-vehicle communication, or may detect the other vehicle OV via road-to-vehicle communication.

The vehicle control device 10 includes a storage unit 11 and a control unit 12.

The storage unit 11 is, for example, a read only memory (ROM), a random access memory (RAM), or a hard disk. The storage unit 11 stores various programs for causing the control unit 12 to function. The storage unit 11 stores a vehicle control program that causes the control unit 12 to function as a steering control unit 121, a first arrival time calculating unit 122, a second arrival time calculating unit 123, and a speed control unit 124.

The control unit 12 is, for example, a central processing unit (CPU). The control unit 12 executes the vehicle control programs stored in the storage unit 11, so as to function as the steering control unit 121, the first arrival time calculating unit 122, the second arrival time calculating unit 123, and the speed control unit 124.

The steering control unit 121 applies a torque to a motor (not shown) provided on a steering shaft, so as to perform steering control such that the vehicle V travels on a center of a lane. The steering control unit 121 identifies the center of the lane on which vehicle V is traveling and identifies a deviation amount from the center of lane of vehicle V based on an image captured by imaging device 2, and performs steering control so as to reduce the deviation amount.

In a case where the first lane L1, on which the vehicle V is traveling, merges into the second lane L2 to disappear in front of the vehicle V, the steering control unit 121 causes the vehicle V to make a lane change to the second lane L2. In a case where the first lane L1, on which the vehicle V is traveling, separates from the second lane L2 in front of the vehicle V, when the vehicle V is planned to proceed in a direction corresponding to the second lane L2 side, the steering control unit 121 causes the vehicle V to make a lane change to the second lane L2.

The first arrival time calculating unit 122 calculates the first arrival time T1, which is a period of time until the vehicle V reaches the lane change position P.

First, the first arrival time calculating unit 122 identifies the lane change position P based on the captured image on the front side of vehicle V captured by the imaging device 2. Then, the first arrival time calculating unit 122 identifies a distance from vehicle V to the lane change position P based on the captured image. The first arrival time calculating unit 122 calculates the first arrival time T1 by dividing the distance to the lane change position P with the speed of the vehicle V indicated by the speed information output from the speed sensor 3.

The second arrival time calculating unit 123 calculates the second arrival time T2, which is a period of time until the other vehicle OV traveling on the second lane L2 within the prescribed range of the vehicle V reaches the lane change position P.

First, when the other vehicle information is acquired from other vehicle detecting sensor 4, the second arrival time calculating unit 123 determines whether or not the other vehicle OV is traveling on the second lane L2 within the prescribed range from the vehicle V based on the relative position indicated by the other vehicle information.

When the other vehicle OV is determined as traveling on the second lane L2 within the prescribed range from the vehicle V, the second arrival time calculating unit 123 calculates the speed of the other vehicle OV based on the relative speed between the vehicle V and the other vehicle OV indicated by the other vehicle information and the speed of the vehicle V indicated by the speed information output from the speed sensor 3. The second arrival time calculating unit 123 calculates the distance from the other vehicle OV to the lane change position P based on the relative distance between the vehicle V and the other vehicle OV indicated by the other vehicle information and the distance from the vehicle V to the lane change position P. The second arrival time calculating unit 123 calculates the second arrival time T2 by dividing the distance from the other vehicle OV to the lane change position P with the speed of the other vehicle OV.

The speed control unit 124 controls the actuator 1 so as to control the speed of the vehicle V, such that in a case where the first arrival time T1 is shorter than the second arrival time T2, the vehicle V enables to make a lane change to the second lane L2 ahead of the other vehicle OV. For example, the speed control unit 124 controls the drive actuator included in the actuator 1, so as to accelerate the vehicle V.

The speed control unit 124 controls the actuator 1 so as to control the speed of the vehicle V, such that in a case where the first arrival time T1 is equal to or greater than the second arrival time T2, the vehicle V enables to make a lane change to the second lane L2 behind the other vehicle OV. For example, the speed control unit 124 controls the drive actuator included in the actuator 1, so as to not change the speed of the vehicle V. or to decelerate the vehicle V. The speed control unit 124 may also control the brake actuator included in the actuator 1, so as to decelerate the vehicle V.

Here, in a case where a difference between the first arrival time T1 and the second arrival time T2 is slight, the vehicle V and the other vehicle OV reach the lane change position P substantially at the same time, so that the vehicle V and the other vehicle OV may collide with each other. Therefore, in a case where the first arrival time T1 is shorter than the second arrival time T2, the speed control unit 124 determines whether or not the difference between the second arrival time T2 and the first arrival time T1 is within a prescribed time. Then, when the difference between the second arrival time T2 and the first arrival time T1 is determined as within the prescribed time, the speed control unit 124 determines whether or not the vehicle V enables to make a lane change to the second lane L2 ahead of the other vehicle OV based on a performance of the vehicle V.

Here, in a case where the speed control unit 124 determines whether or not the vehicle V enables to make a lane change to the second lane L2 ahead of the other vehicle OV based on the performance of the vehicle V, the determination may be made in consideration of a weight of a load that vehicle V is loaded with. In this case, performance information indicating the performance of vehicle V is stored in the storage unit 11 in advance, and a weight measuring sensor that measures the weight of the load that the vehicle V is loaded with is provided in the vehicle V in advance. Then, when the difference between the second arrival time T2 and the first arrival time T1 is determined as within the prescribed time, the speed control unit 124 identifies the performance of vehicle V indicated by the performance information stored in the storage unit 11 and the weight of the load measured by the weight measuring sensor. The speed control unit 124 determines whether or not the vehicle V can be accelerated such that the difference between the first arrival time T1 and the second arrival time T2 is greater than the prescribed time based on the identified performance of the vehicle V and the weight of the load.

In a case where the vehicle V is capable of accelerating such that the difference is greater than the prescribed time, the speed control unit 124 determines that the vehicle V enables to make a lane change to the second lane L2 ahead of the other vehicle OV, and controls the actuator 1 so as to accelerate the vehicle V. When the vehicle V is determined as impossible to make a lane change to the second lane L2 ahead of the other vehicle OV, the speed control unit 124 controls the actuator 1 so as to decelerate the vehicle V.

Figure 3:
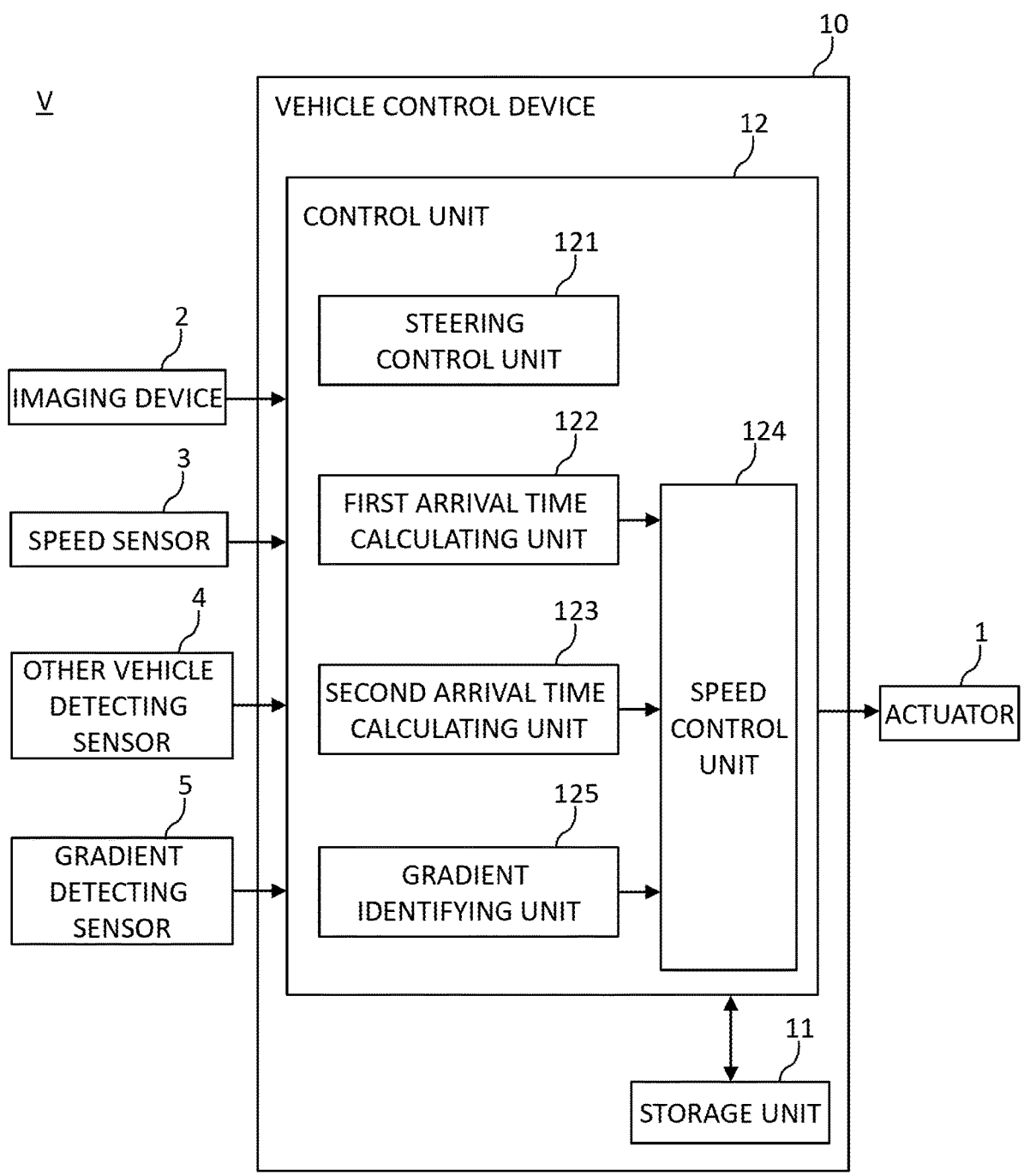
FIG. 3 illustrates another configuration example of the vehicle control device according to the embodiment.

In a case where the speed control unit 124 determines whether or not the vehicle V enables to make a lane change to the second lane L2 ahead of the other vehicle OV, the determination may be made in consideration of a gradient of the first lane L1. FIG. 3 illustrates another configuration example of the vehicle control device 10 according to the present embodiment.

In the configuration example shown in FIG. 3, the vehicle control device 10 further includes a gradient detecting sensor 5 and a gradient identifying unit 125.

The gradient detecting sensor 5 includes, for example, an acceleration sensor, and detects the gradient of the first lane L1 on which the vehicle V travels. The gradient detecting sensor 5 outputs gradient information indicating the detected gradient to the vehicle control device 10.

For example, when the other vehicle detecting sensor 4 detects the other vehicle OV traveling on the second lane L2 within the prescribed range of the vehicle V, the gradient identifying unit 125 identifies the gradient of the first lane L1 on which the vehicle V is traveling based on the gradient information acquired from the gradient detecting sensor 5.

Then, in the case where the first arrival time T1 is shorter than the second arrival time T2, when the difference between the second arrival time T2 and the first arrival time T1 is within the prescribed time, the speed control unit 124 determines whether or not the vehicle V enables to make a lane change to the second lane L2 ahead of the other vehicle OV based on the performance of the vehicle V and the gradient of the first lane L1. In a case where the speed control unit 124 determines that the vehicle V enables to make a lane change to the second lane L2 ahead of the other vehicle OV, the speed control unit 124 controls the actuator 1 so as to accelerate the vehicle V.

In this way, the vehicle control device 10 can determine whether or not the vehicle V enables to make a lane change ahead of the other vehicle OV while considering the gradient of the first lane L1.

[Flow of Processing in Vehicle Control Device 10]

Figure 4:
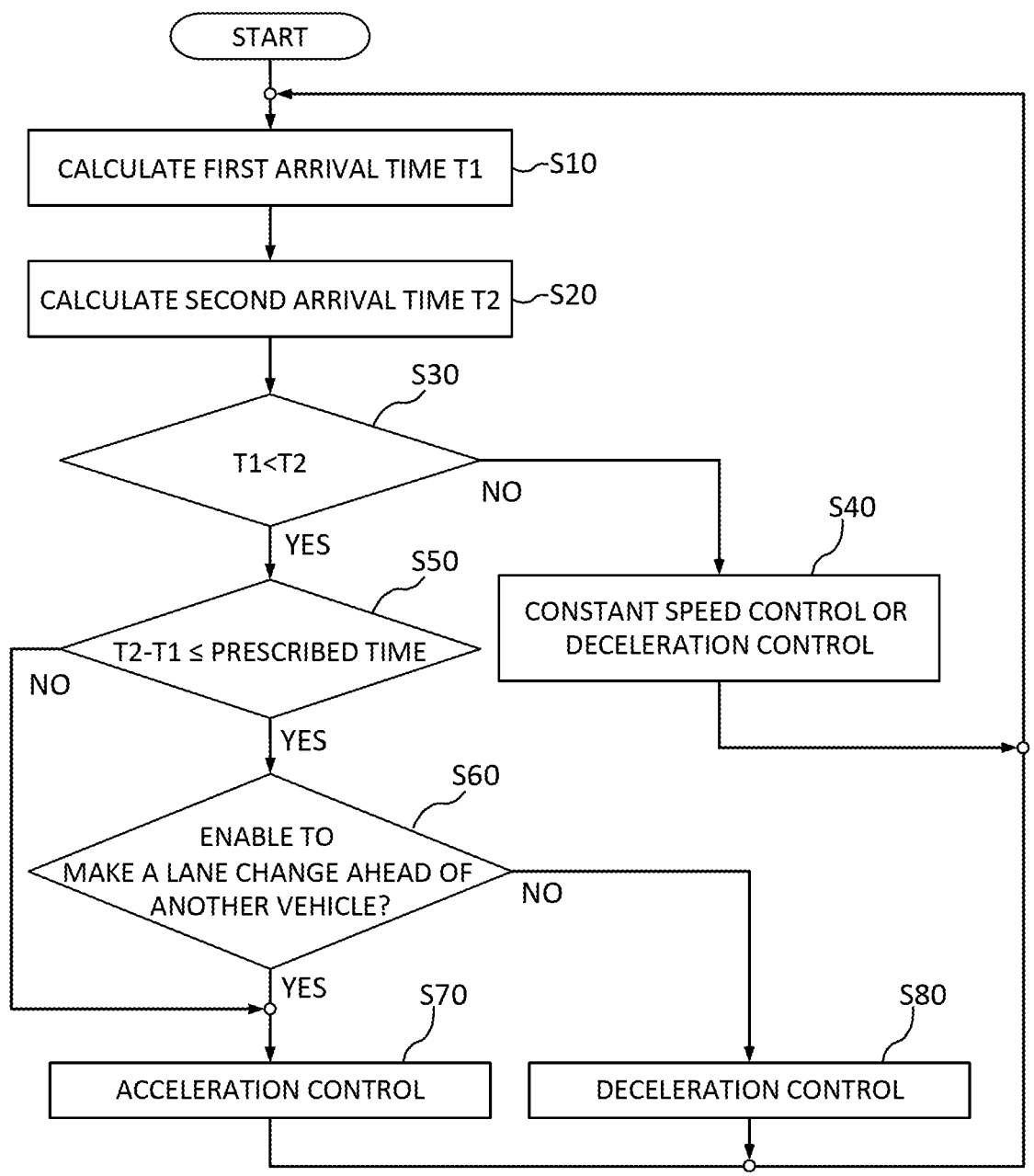
FIG. 4 is a flowchart illustrating a flow of processing in the vehicle control device according to the embodiment.

Next, a flow of processing in the vehicle control device 10 will be described. FIG. 4 is a flowchart illustrating a flow of processing in the vehicle control device 10.

first, the first arrival time calculating unit 122 calculates the first arrival time T1, which is a period of time until the vehicle V reaches the lane change position P (S10).

Subsequently, the second arrival time calculating unit 122 calculates the second arrival time T2, which is a period of time until the other vehicle OV traveling on the second lane L2 within the prescribed range of the vehicle V reaches the lane change position P (S20).

Subsequently, speed control unit 124 determines whether or not the first arrival time T1 is shorter than the second arrival time T2 (S30). When the speed control unit 124 determines that the first arrival time T1 is shorter than the second arrival time T2, the process proceeds to S50. When the speed control unit 124 determines that the first arrival time T1 is equal to or greater than the second arrival time T2, the process proceeds to S40, and the speed control unit 124 controls the actuator 1 so as to perform constant speed control or deceleration control of the vehicle V. Thereafter, the speed control unit 124 proceeds to S10.

In S50, the speed control unit 124 determines whether or not the difference between the second arrival time T2 and the first arrival time T1 is within the prescribed time. When the speed control unit 124 determines that the difference between the second arrival time T2 and the first arrival time T1 is within the prescribed time, the process proceeds to S60, and when the speed control unit 124 determines that the difference between the second arrival time T2 and the first arrival time T1 is greater than the prescribed time, the process proceeds to S70.

In S60, the speed control unit 124 determines whether or not the vehicle V enables to make a lane change to the second lane L2 ahead of the other vehicle OV based on the performance of the vehicle V. When the speed control unit 124 determines that the vehicle V enables to make a lane change to the second lane L2 ahead of the other vehicle OV, the process proceeds to S70. When the speed control unit 124 determines that the vehicle V enables to make a lane change to the second lane L2 ahead of the other vehicle OV, the process proceeds to S80.

In S70, the speed control unit 124 controls the actuator 1 so as to perform acceleration control of the vehicle V. Thereafter, the speed control unit 124 proceeds to S10.

In S80, the speed control unit 124 controls the actuator 1 so as to perform deceleration control of the vehicle V. Thereafter, the speed control unit 124 proceeds to S10.

Effects According to the Present Embodiment

As described above, the vehicle control device 10 according to the present embodiment calculates the first arrival time T1, which is a period of time the until vehicle V reaches the lane change position P, and calculates the second arrival time T2, which is a period of time until the other vehicle OV traveling on the second lane L2 within the prescribed range of the vehicle V reaches the lane change position P. Then, the vehicle control device 10 controls the speed of the vehicle V such that in a case where the first arrival time T1 is shorter than the second arrival time T2, the vehicle V enables to make a lane change from the first lane L1 to the second lane L2 ahead of the other vehicle OV, and controls the speed of the vehicle V such that in a case where the first arrival time T1 is equal to or greater than the second arrival time T2, the vehicle V enables to make a lane change from the first lane L1 to the second lane L2 behind the other vehicle OV.

In this way, when the lane, on which the vehicle V is traveling, merges into or separates from another lane in front of the vehicle V, the vehicle control device 10 can cause the vehicle V to make a lane change so as not to collide with the other vehicle OV traveling on a lane different from the traveling lane.

Although the present disclosure has been described using embodiments, the technical scope of the present disclosure is not limited to the scope described in the above embodiment, and various modifications and changes can be made without departing from the scope thereof.

For example, in the embodiment described above, the vehicle control device 10 controls the speed of the vehicle V such that the vehicle V enables to make a lane change to the second lane L2 ahead of the other vehicle OV in a case where the first arrival time T1 is shorter than the second arrival time T2, but is not limited thereto. The speed control unit 124 of the vehicle control device 10 may calculate an acceleration of the other vehicle OV or calculate a relative acceleration with respect to the vehicle V of the other vehicle OV based on the relative speed detected by other vehicle detecting sensor 4 and the speed of vehicle V detected by the speed sensor 3. The speed control unit 124 may control the speed of the vehicle V such that the vehicle V enables to make a lane change to the second lane L2 ahead of the other vehicle OV when the acceleration of the other vehicle OV is smaller than a prescribed value, in a case where the first arrival time T1 is shorter than the second arrival time T2. Further, the speed control unit 124 may control the speed of the vehicle V such that the vehicle V enables to make a lane change to the second lane L2 behind the other vehicle OV when the acceleration of the other vehicle OV is greater than a prescribed value, even in the case where the first arrival time T1 is shorter than the second arrival time T2.

For example, a specific embodiment of distributing and integrating devices is not limited to the above embodiment, and all or a part thereof may be configured to be functionally or physically distributed and integrated into arbitrary units.

The present application is based on the Japanese Patent Application (P2017-133456) filed on Jul. 7, 2017, the contents of which are incorporated herein by reference.

INDUSTRIAL APPLICABILITY

The vehicle speed control device and the vehicle speed control method of the present disclosure is useful for, when a lane, on which a vehicle is traveling, merges into or separates from another lane in front of the vehicle, causing the vehicle to make a lane change so as not to collide with another vehicle traveling on a lane different from the traveling lane.

LIST OF REFERENCE NUMERALS

1 Actuator
2 Imaging device
3 Speed sensor
4 Other vehicle detecting sensor
5 Gradient detecting sensor
10 Vehicle control device
11 Storage unit
12 Control unit
121 Steering control unit
122 First arrival time calculating unit
123 Second arrival time calculating unit
124 Speed control unit
125 Gradient identifying unit
OV Other vehicle
V Vehicle

The invention claimed is:

1. A vehicle speed control device that controls a speed of a vehicle when the vehicle makes a lane change from a first lane, on which the vehicle is traveling, to a second lane, in a case where the first lane merges into the second lane to disappear in front of the vehicle, or in a case where the first lane separates from a second lane in front of the vehicle, the vehicle speed control device comprising:
 a processor coupled to a memory storing instructions to permit the processor to function as:
  a first arrival time calculating unit configured to calculate a first arrival time, which is a period of time until the vehicle reaches a lane change position that is a position where a merge of the first lane and the second lane is completed or a position where a separation of the first lane and the second lane begins;
  a second arrival time calculating unit configured to calculate a second arrival time, which is a period of time until another vehicle traveling on the second lane within a prescribed range of the vehicle reaches the lane change position; and
  a speed control unit configured to control the vehicle according to the first arrival time, the second arrival time, and a weight of a load that the vehicle is loaded with, wherein, in a case where the first arrival time is equal to or greater than the second arrival time, the speed control unit controls the speed of the vehicle such that the vehicle enables to make a lane change to the second lane behind the another vehicle,
wherein, in a case where the first arrival time is shorter than the second arrival time and a difference between the second arrival time and the first arrival time is greater than a prescribed time, the speed control unit controls the speed of the vehicle such that the vehicle enables to make a lane change to the second lane ahead of the another vehicle in a case where the first arrival time is shorter than the second arrival time, and configured to control the speed of the vehicle such that the vehicle enables to make a lane change to the second lane behind the another vehicle, and
wherein, in a case where the first arrival time is shorter than the second arrival time and the difference between the second arrival time and the first arrival time is within the prescribed time, the speed control unit controls the speed of the vehicle according to the first arrival time, the second arrival time, and the weight of the load that the vehicle is loaded with.

2. The vehicle speed control device according to claim 1, wherein, in the case where the first arrival time is shorter than the second arrival time, and the difference between the second arrival time and the first arrival time is within the prescribed time, the speed control unit determines whether or not the vehicle enables to make a lane change to the second lane ahead of the another vehicle based on a performance of the vehicle, and
 wherein the speed control unit is configured to:
  accelerate the vehicle when the speed control unit determines that the vehicle enables to make a lane change to the second lane ahead of the another vehicle; and
  decelerate the vehicle when the speed control unit determines that the vehicle does not enable to make a lane change to the second lane ahead of the another vehicle.

3. The vehicle speed control device according to claim 2, wherein the processor further functions as:
 a gradient identifying unit configured to identify a gradient of the first lane, and
 wherein, in a case where the first arrival time is shorter than the second arrival time, when the difference between the second arrival time and the first arrival time is within the prescribed time, the speed control unit determines whether or not the vehicle enables to make a lane change to the second lane ahead of the another vehicle based on the performance of the vehicle and the gradient of the first lane.

4. A vehicle speed control method of controlling a speed of a vehicle with a computer when the vehicle makes a lane change from a first lane, on which the vehicle is travelling, to a second lane, in a case where the first lane merges into the second lane to disappear in front of the vehicle, or in a case where the first lane separates from a second lane in front of the vehicle, the vehicle speed control method comprising:
 executing with the computer:
  a step of calculating a first arrival time, which is a period of time until the vehicle reaches a lane change position that is a position where a merge of the first lane and the second lane is completed or a position where a separation of the first lane and the second lane begins;

a step of calculating a second arrival time, which is a period of time until another vehicle traveling on the second lane within a prescribed range of the vehicle reaches the lane change position; and a step of controlling the vehicle according to the first arrival time, the second arrival time, and a weight of a load that the vehicle is loaded with, wherein, in a case where the first arrival time is equal to or greater than the second arrival time, the controlling the vehicle includes controlling the speed of the vehicle such that the vehicle enables to make a lane change to the second lane behind the another vehicle, wherein, in a case where the first arrival time is shorter than the second arrival time and a difference between the second arrival time and the first arrival time is greater than a prescribed time, the controlling the vehicle includes controlling the speed of the vehicle such that the vehicle enables to make a lane change to the second lane ahead of the another vehicle in a case where the first arrival time is shorter than the second arrival time, and configured to control the speed of the vehicle such that the vehicle enables to make a lane change to the second lane ahead of the another vehicle, and wherein, in a case where the first arrival time is shorter than the second arrival time and the difference between the second arrival time and the first arrival time is within the prescribed time, the controlling the vehicle includes controlling the speed of the vehicle according to the first arrival time, the second arrival time, and the weight of the load that the vehicle is loaded with.

\* \* \* \* \*